United States Patent
Kirkwood et al.

[11] Patent Number: 5,313,793
[45] Date of Patent: May 24, 1994

[54] TORQUE CONVERTER HAVING AXIAL TYPE REACTOR

[75] Inventors: Malcolm E. Kirkwood, Livonia; Michael E. Fingerman, Labelle, both of Mich.

[73] Assignee: Borg-Warner Automotive, Inc., Sterling Heights, Mich.

[21] Appl. No.: 950,862

[22] Filed: Sep. 24, 1992

[51] Int. Cl.$^5$ .............................................. F16D 33/00
[52] U.S. Cl. ...................................................... 60/361
[58] Field of Search ................ 60/330, 341, 345, 361, 60/362

[56] References Cited

U.S. PATENT DOCUMENTS

| | | | |
|---|---|---|---|
| 2,755,628 | 7/1956 | Mamo | 60/362 X |
| 2,821,839 | 2/1958 | Peras | 60/341 |
| 2,917,001 | 12/1959 | Zeidler et al. | 60/362 X |
| 3,797,243 | 3/1974 | Trusov | 60/361 |
| 3,828,554 | 8/1974 | Hau | 60/361 |
| 4,186,557 | 2/1980 | Arai et al. | |
| 4,377,068 | 3/1983 | Braatz | 60/341 |
| 4,624,105 | 11/1986 | Nishimura et al. | |
| 4,726,185 | 2/1988 | Shiegemasa et al. | 60/361 |
| 4,974,710 | 12/1990 | Murasugi | |
| 4,974,715 | 12/1990 | Koyama | |
| 5,058,027 | 10/1991 | Becraft | |
| 5,125,487 | 6/1992 | Hodge | 60/345 X |
| 5,224,348 | 7/1993 | Ejiri | 60/361 |

FOREIGN PATENT DOCUMENTS 52-51986  1/1977  Japan.
52-131069 2/1977  Japan.

Primary Examiner—Edward K. Look
Assistant Examiner—John Ryznic
Attorney, Agent, or Firm—Reising, Ethington, et al.; Greg Dziegielewski

[57] ABSTRACT

A torque converter has an axial type reactor that is disposed between a turbine and an impeller at an inner end to form a toroid. The reactor blades have leading edges that slant toward the turbine in the radially inward direction and form an angle with an inner shell ring that varies between 60° and 90°. The leading edges also slant circumferentially so that radial lines intersecting the respective connection points of the leading edge with the inner shell ring and an outer core ring form a central angle that varies between 5° in one direction and 12° in the other direction.

13 Claims, 4 Drawing Sheets

TORQUE CONVERTER HAVING AXIAL TYPE REACTOR

BACKGROUND OF THE INVENTION

This invention relates generally to torque converters and more particularly to torque converters that have axial type reactors.

Two types of reactors are currently used in automotive and industrial torque converters. These are the radial type and the axial type. Radial type reactors are conventionally used and perform very well. However radial type reactors are expensive to manufacture and consequently axial type reactors have a significant cost advantage over radial type reactors. On the other hand, axial type reactors typically have a 1 to 3% efficiency disadvantage within converter operating range in comparison to radial type reactors.

SUMMARY OF THE INVENTION

The object of this invention is to improve the performance of torque converters that have axial type reactors in order to take advantage of the cost saving and avoid the disadvantages associated with loss in efficiency as much as possible.

This improved performance is generally achieved by providing a torque converter with an axial type reactor that has one or both of the following features.

One feature of the torque converter of the invention is that the axial type reactor has reactor blades that have leading edges that slant toward the turbine in the radially inward direction and form a slant angle with an inner shell ring so that the gap between the reactor and the turbine is reduced.

Another feature of the torque converter of the invention is that the axial type reactor has reactor blades that slant circumferentially so that the leading edges of the reactor blades are attached to the inner shell ring and to the outer core ring at different radial lines that form a central angle.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1A:
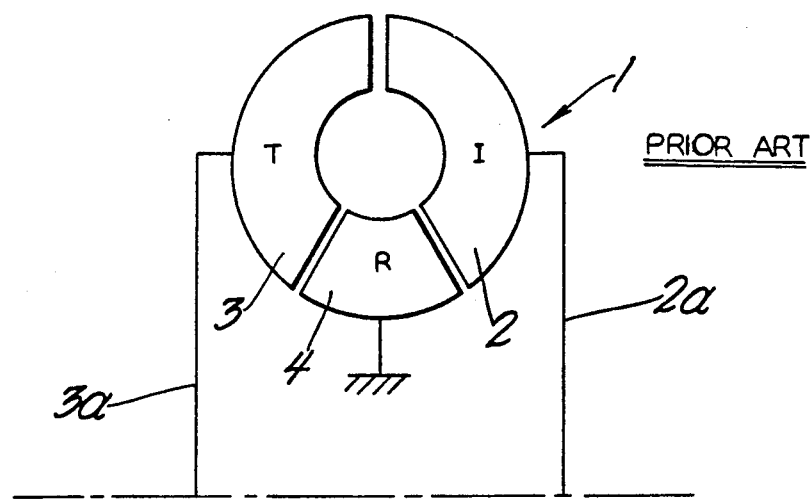
FIG. 1a is a schematic structural view of a typical prior art torque converter that has a conventional radial type reactor.

Referring now to the drawing and by way of background, FIG. 1a schematically discloses a typical prior art torque converter 1 for an automobile or the like comprising an impeller 2, a turbine 3 and a radial type reactor 4. The impeller 2 is driven by means of an input member 2a. The turbine 3 is disposed in front of the impeller 2 and it drives an output member 3a. The reactor 4 is stationery and it is disposed between the impeller 2 and the turbine 3 so that the impeller 2, turbine 3 and reactor 4 form a toroid for circulating hydraulic fluid in a closed loop in a well known manner.

Figure 1B:
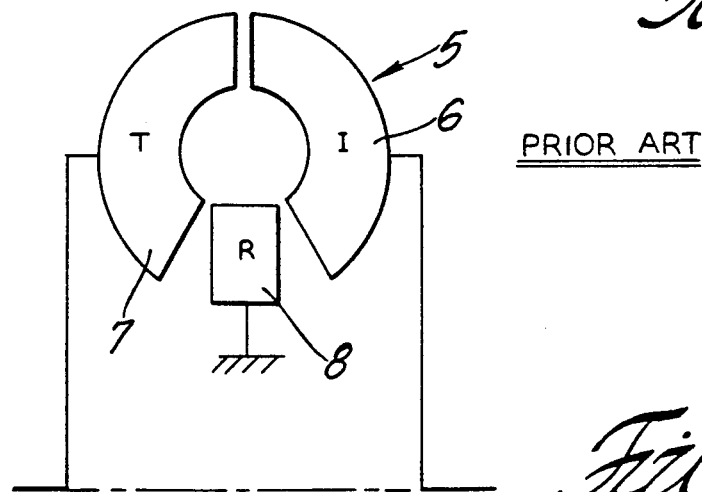
FIG. 1b is a schematic structural view of a typical prior art torque converter that has a conventional axial type reactor.

FIG. 1b schematically discloses a typical prior art torque converter 5 comprising an impeller 6, a turbine 7 and an axial type reactor 8. The axial type reactor 8 like the radial type reactor 4 is disposed between the impeller 6 and the turbine 7 so that the impeller 2, turbine 3 and axial type reactor 4 also form a toroid for circulating hydraulic fluid in a closed loop in a well known manner. In both instances the reactors redirect fluid that exits from the turbine into the impeller. However, the radial type reactor is more efficient than the axial type reactor due to the shape of the reactor and the reactor blades that are outlined in the schematic FIGS. 1a and 1b. (Reactors generally comprise a plurality of circumferentially spaced reactor blades that are attached to an outer core ring and an inner shell ring as shown in FIGS. 1c through 4). The radial type reactor blades are curved in the axial direction and angular in plan form. Consequently the radial type reactor fills the toroidal segment between the turbine and the impeller very efficiently as shown in FIG. 1a. On the other hand the axial type reactor blades are straight in the axial direction and square in plan form. Consequently the axial type reactor does not fill the toroidal segment as well as the radial type reactor.

But as indicated above the radial type reactor is more expensive to manufacture. Reactors typically comprise metal castings, usually made of aluminum or other light weight material. The radial type reactor typically comprises a metal casting consisting of an inner shell ring and reactor blades that are formed by mold cores that are withdrawn radially from the finished casting. A separate outer core ring is then attached to the tips of the blades of the finished casting. This process provides considerable latitude in shaping the reactor and the reactor blades for efficient flow of the hydraulic fluid. On the other hand, the axial type reactor typically comprises a one piece metal casting consisting of inner and outer rings and reactor blades between the rings that are formed by cores that are withdrawn axially from the finished casting. This process is cheaper but the resulting shape of the reactor and the reactor blades is not as efficient as the radially type as noted above.

Figure 1C:
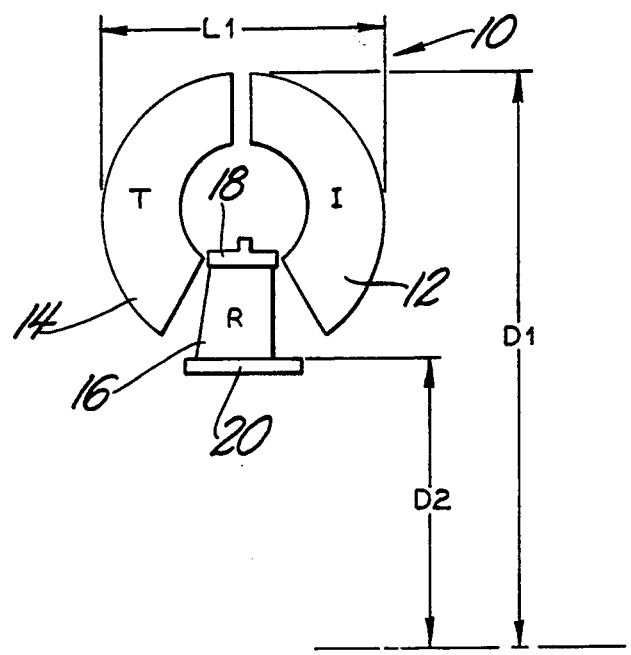
FIG. 1c is a schematic structural view of a torque converter having an axial type reactor in accordance with the invention.

Referring now to FIG. 1c, a torque converter 10 according to this invention for an automobile or the like comprises an impeller 12, a turbine 14 and a modified axial type reactor 16. The impeller 12 is driven by an internal combustion engine (not shown). The turbine 14 is disposed in front of the impeller 12 at an outer end and it drives a geared transmission (not shown). The reactor 16 is disposed between the impeller 12 and the turbine 14 at the opposite inner end so that the impeller 12, turbine 14 and retractor 16 form a toroid for circulating hydraulic fluid in a closed loop in a well known manner.

The torque converter 10 is shaped so that the ratio of the toroidal internal diameter D2 to the toroidal external diameter D1 is between 0.30 and 0.45 and the ratio of the toroidal axial length L to the radial height (D1-D2)/2 is between 0.65 and 1.00.

Figure 2:
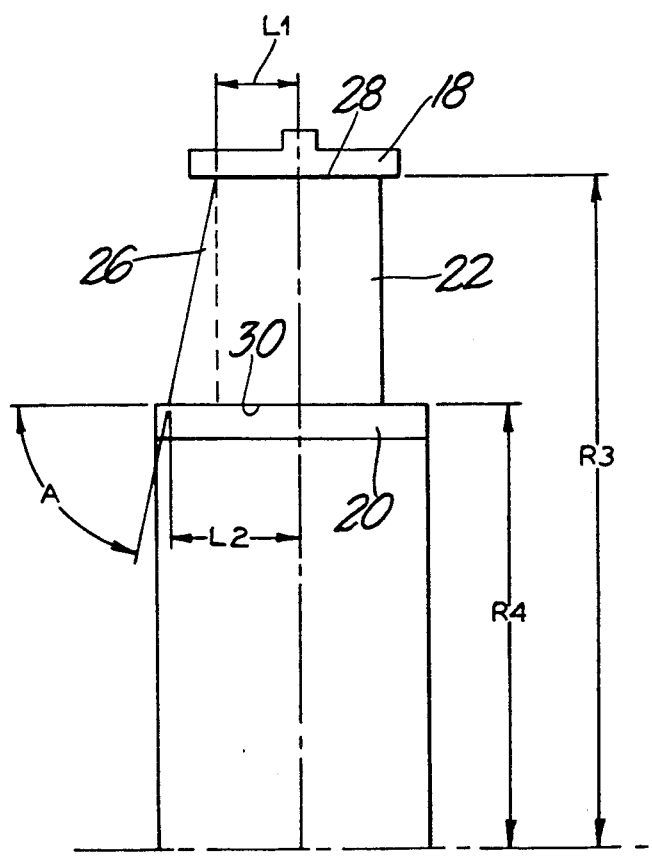
FIG. 2 is an axial section of the axial reactor that is shown schematically in FIG. 1c.
Figure 3:
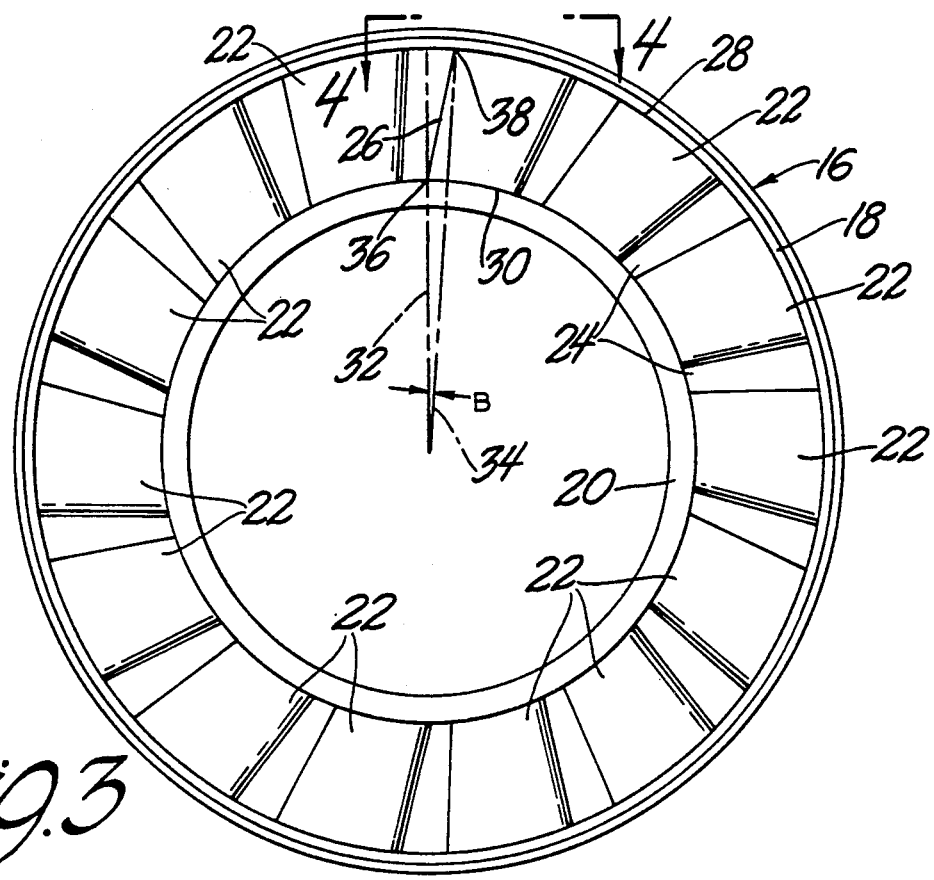
FIG. 3 is a front view of the axial type reactor that is shown in FIG. 2.

Referring now to figures 2 and 3, the axial type reactor 16 itself comprises an outer core ring 18, a concentric inner shell ring 20 and a plurality of circumferentially spaced reactor blades 22 that are attached to the outer core ring 18 and the inner shell ring 20 at their opposite ends. The rings 18 and 20 are substantially uniform in diameter and the height of reactor blades 22 is substantially uniform which are characteristics of axial type reactors. The reactor blades 22 are spaced apart in the circumferential direction to provide flow passages 24 for the hydraulic fluid returning from the turbine 14 back to the impeller 12.

Figure 4:
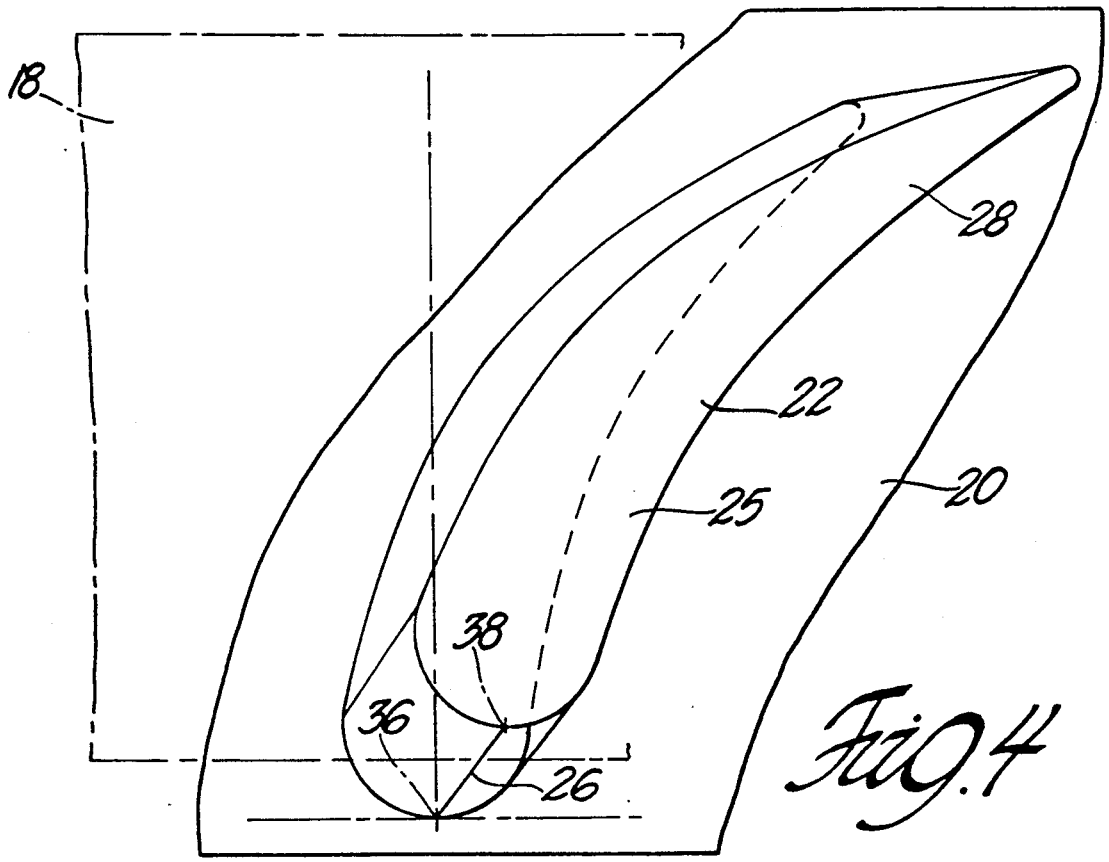
FIG. 4 is a section taken substantially along the line 4—4 of FIG. 3 looking in the direction of the arrows.

The reactor blades 22 have curved hydrofoil shaped bodies 25 that are attached in a slanted orientation in the axial direction as shown in FIG. 4 to redirect the flow of hydraulic fluid in a well known manner. The hydrofoil bodies 25 of the reactor blades 22 have leading edges 26 facing the turbine 14 and increase in width uniformly from an outer end 28 that is attached to the outer core ring 18 to an inner end 30 that is attached to the shell ring 20. Thus the leading edges 26 of the reactor blades 22 slant toward the turbine 14 in the radially inward direction as shown in FIG. 2. The slanted leading edges 26 and the inner shell ring 20 define a angle A that is the arctangent of the blade height (R3-R4) divided by the length increase at the inner shell ring (L2-L1). Slant angle A which is an important feature of this invention, improves performance of an axial type reactor when the slant angle A of the blade leading edges is more than about 60° but less than 90° and more certainly when the slant angle is between about 75° and 85°.

Figure 6:
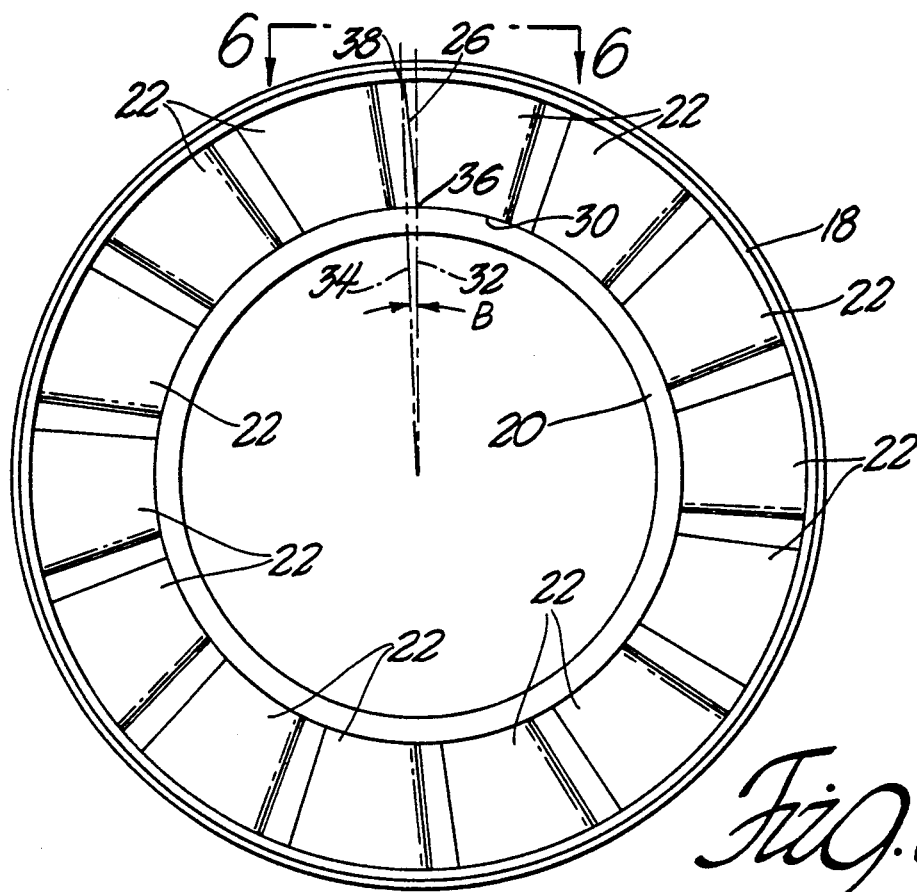
FIG. 6 is also a front view of the axial type reactor shown in FIG. 2 but illustrating a negative central angle.

The reactor blades 22 are also slanted in the circumferential direction as illustrated in Figure 3. In this instance, the leading edges 26 slant circumferentially in the radially inward direction so that radial lines 32 and 34 intersecting the respective connection points 36 and 38 of the leading edge 26 with the inner shell ring 20 and the outer core ring 18 form a central angle B. Central angle B which is another important feature of this invention, also improves performance when central angle B is greater than zero but less than about 12° in the direction of impeller rotation or less than zero but greater than about −5° that is, in the direction opposite impeller rotation. (FIG. 3 shows a positive central angle B in the direction of impeller rotation which in this instance is clockwise FIG. 6 shows a negative central angle B opposite the direction of impeller rotation which in this instance is counterclockwise.) Central angle B also has preferred ranges which are between about 1.0° and 4.5° in the direction of impeller rotation and between about −0.5° and −1.0° in the opposite direction.

Figure 5:
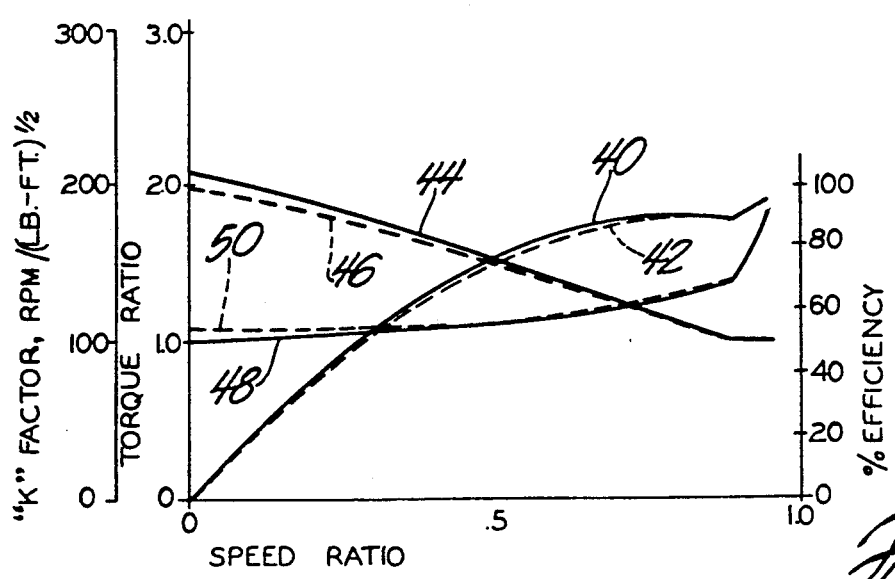
FIG. 5 is a graph showing the efficiencies, torque ratios and "K" factors of the present invention in comparison to conventional axial type reactors.
Figure 7:
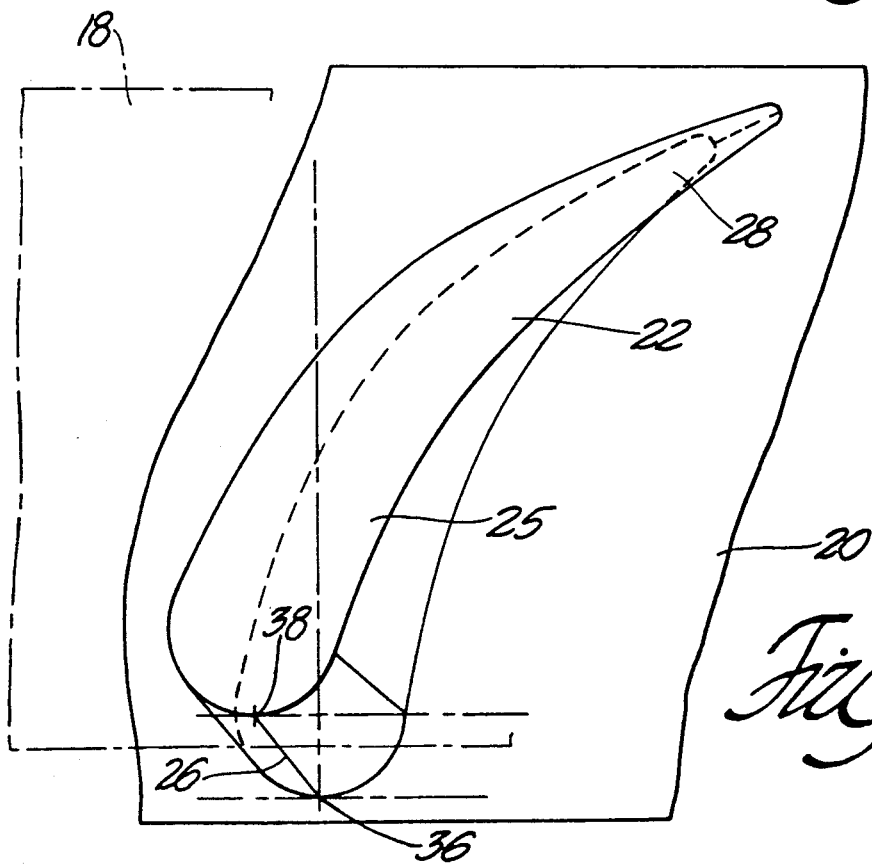
FIG. 7 is a section taken substantially along the line 7—7 of FIG. 6 looking in the direction of the arrows.

Slanting the leading edge of the reactor blades 22 radially inwardly toward the turbine 14 as shown in FIGS. 2 and 4 and/or circumferentially as shown in FIGS. 3 and 4 or in FIGS. 6 and 7 increases capacities, torque ratios and efficiencies in torque converters with axial type reactors as shown in FIG. 5.

FIG. 5 is a chart graphing the performance of a torque converter having both features of this invention in comparison to a torque converter having a conventional axial type reactor such as that shown schematically in Figure 1b in a generalized way. This generalized chart shows that an improved efficiency curve 40 for the invention in comparison to the efficiency curve 42 of the prior art torque converter as well as an improved torque ratio curve 44 in comparison to the torque ratio curve 46 of the prior art. The capacity is also improved as indicated by the reciprocal-like "K" factor curve 48 of the invention that is lower than the "K" factor curve 50 of the prior art torque converter.

Moreover improved flow velocity distribution and better balance reduces shock and friction losses in the reactor because of significant reduction of vortex effects when compared with conventional axial type reactors. Use of either or both slant features can also contribute to maintaining an optimum flow passage cross section and results in improved performance.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A torque converter (10) for an automobile or the like comprising:

an impeller (12), a turbine (14) and an axial type reactor (16), the turbine (14) being disposed adjacent the impeller (12) at one end and the reactor (16) being disposed between the impeller (12) and the turbine (14) at the other end so that the impeller (12), the turbine (14) and the reactor 16 form a toroid;

the reactor (16) having an outer core ring (18), an concentric inner shell ring (20) and a plurality of circumferentially spaced reactor blades (22) that are connected to the core ring (18) and the shell ring (20) at their opposite ends;

each of the reactor blades (22) having a leading edge (26) facing the turbine (14) that slants toward the turbine in the radially inward direction so that the leading edge (26) and the inner shell ring (20) form a slant angle A that is more than about 60 degrees but less than 90 degrees, and each of the reactor blades (22) being slanted in the circumferential direction so that radial lines (32) and (34) intersecting respective connection points (36) and (38) of the leading edge (26) with the inner shell ring (20) and the outer core ring (18) form a central angle B excluding zero degrees.

2. The torque converter as defined in claim 1 wherein the leading edge (26) and the inner shell ring (20) form a slant angle A that is more than about 75 degrees but less than about 85 degrees.

3. The torque converter as defined in claim 2 wherein the radial lines (32) and (34) intersecting respective connection points (36) and (38) of the leading edge (26) with the inner shell ring (20) and the outer core ring (18)

form a central angle B that is less than about 12 degrees in the direction of impeller rotation but more than about −5 degrees in the opposite direction.

4. The torque converter as defined in claim 2 wherein the radial lines (32) and (34) intersecting respective connection points (36) and (38) of the leading edge (26) with the inner shell ring (20) and the outer core ring (18) form a central angle B that is less than about 12 degrees but greater than zero degrees in the direction of impeller rotation or more than about −5 degrees bit less than zero degrees in the opposite direction.

5. The torque converter as defined in claim 2 wherein the radial lines (32) and (34) intersecting respective connection points (36) and (38) of the leading edge (26) with the inner shell ring (20) and the outer core ring (18) form a central angle B that is less than about 4.5 degrees but greater than about 1.0 degrees in the direction of impeller rotation or more than about −1.0 degrees but less than about −0.5 degrees in the opposite direction.

6. The torque converter as defined in claim 1 wherein the radial lines (32) and (34) intersecting respective connection points (36) and (38) of the leading edge (26) with the inner shell ring (20) and the outer core ring (18) form a central angle B that is less than about 12 degrees in the direction of impeller rotation but more than about −5 degrees in the opposite direction.

7. The torque converter as defined in claim 1 wherein the radial lines (32) and (34) intersecting respective connection points (36) and (38) of the leading edge (26) with the inner shell ring (20) and the outer core ring (18) form a central angle B that is less than about 12 degrees but greater than zero degrees in the direction of impeller rotation or more than about −5 degrees but less than zero degrees in the opposite direction.

8. The torque converter as defined in claim 1 wherein the radial lines (32) and (34) intersecting respective connection points (36) and (38) of the leading edge (26) with the inner shell ring (20) and the outer core ring (18) form a central angle B that is less than about 4.5 degrees but greater than about 1.0 degrees in the direction of impeller rotation or more than about −1.0 degrees but less than about −0.5 degrees in the opposite direction.

9. A torque converter (10) for an automobile or the like comprising;
an impeller (12), a turbine (14) and an axial type reactor (16),
the turbine (14) being disposed adjacent the impeller (12) at one end and the reactor (16) being disposed between the impeller (12) and the turbine (14) at the other end so that the impeller (12), the turbine (14) and the reactor 16 form a toroid;
the reactor (16) having an outer core ring (18), an concentric inner shell ring (20) and a plurality of circumferentially spaced reactor blades (22) that are connected to the core ring (18) and the shell ring (20) at their opposite ends;
each of the reactor blades (22) having a leading edge (26) facing the turbine (14) that slants toward the turbine in the radially inward direction so that the leading edge (26) and the inner shell ring (20) form a slant angle A that is more than about 60 degrees but less than 90 degrees,
each of the reactor blades (22) being slanted in the circumferential direction so that radial lines (32) and (34) intersecting respective connection points (36) and (38) of the leading edge (26) with the inner shell ring (20) and the outer core ring (18) form a central angle B that is less than about 12 degrees in the direction of impeller rotation but more than about −5 degrees in the opposite direction,
the ratio of the toroidal internal diameter D2 to the toroidal internal diameter D1 being between 0.30 and 0.45, and the ratio of the toroidal axial length L to the toroidal radial height (D1−D2)/2 being between 0.65 and 1.00.

10. A torque converter (10) for an automobile or the like comprising;
an impeller (12), a turbine (14) and an axial type reactor (16),
the turbine (14) being disposed adjacent the impeller (12) at one end and the reactor (16) being disposed between the impeller (12) and the turbine (14) at the other end so that the impeller (12), the turbine (14) and the reactor 16 form a toroid;
the reactor (16) having an outer core ring (18), an concentric inner shell ring (20) and a plurality of circumferentially spaced reactor blades (22) that are connected to the core ring (18) and the shell ring (20) at their opposite ends; and
each of the reactor blades (22) having a leading edge (26) facing the turbine (14) that slants toward the turbine in the radially inward direction so that the leading edge (26) and the inner shell ring (20) form a slant angle A that is more than about 60 degrees but less than 90 degrees.

11. The torque converter as defined in claim 10 wherein the leading edge (26) and the inner shell ring (20) form a slant angle A that is more than about 75 degrees but less than about 85 degrees.

12. A torque converter (10) for an automobile or the like comprising;
an impeller (12), a turbine (14) and an axial type reactor (16),
the turbine (14) being disposed adjacent the impeller (12) at one end and the reactor (16) being disposed between the impeller (12) and the turbine (14) at the other end so that the impeller (12), the turbine (14) and the reactor 16 form a toroid;
the reactor (16) having an outer core ring (18), a concentric inner shell ring (20) and a plurality of circumferentially spaced reactor blades (22) that are connected to the core ring (18) and the shell ring (20) at their opposite ends; and
each of the reactor blades (22) being slanted in the circumferential direction so that radial lines (32) and (34) intersecting respective connection points (36) and (38) of the leading edge (26) with the inner shell ring (20) and the outer core ring (18) form a central angle B that is less than about 12 degrees but more than zero degrees in the direction of impeller rotation or more than about −5 degrees but less than zero degrees in the opposite direction.

13. The torque converter as defined in claim 12 wherein the radial lines (32) and (34) intersecting respective connection points (36) and (38) of the leading edge (26) with the inner shell ring (20) and the outer core ring (18) form a central angle B that is less than about 4.5 degrees but greater than about 1.0 degrees in the direction of impeller rotation or more than about −1.0 degrees but less than about −0.5 degrees in the opposite direction.

* * * * *